Dec. 25, 1962 C. L. SHOBE 3,070,114
APPARATUS FOR ELIMINATING UNDESIRED AIR FROM THE
WATER OF HEATING AND COOLING SYSTEMS
Filed Aug. 18, 1960 2 Sheets-Sheet 1

INVENTOR.
CHESTER L. SHOBE

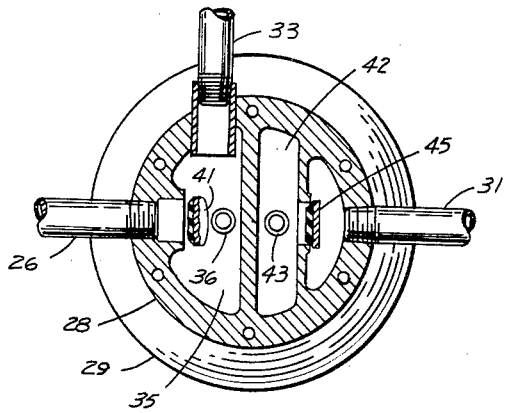
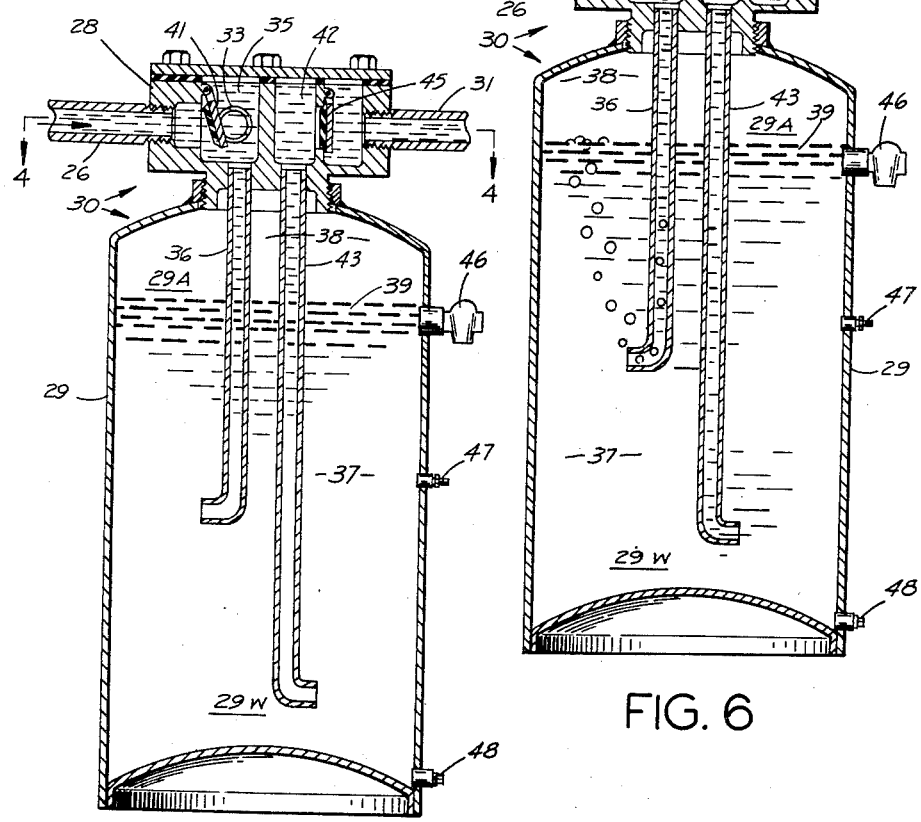
FIG. 4
FIG. 5
FIG. 6
INVENTOR.
CHESTER L. SHOBE

United States Patent Office 3,070,114
Patented Dec. 25, 1962

3,070,114
APPARATUS FOR ELIMINATING UNDESIRED AIR FROM THE WATER OF HEATING AND COOLING SYSTEMS
Chester L. Shobe, Great Bend, Kans., assignor of one-tenth to Gadget-Of-The-Month Club, Inc., North Hollywood, Calif., a corporation of California
Filed Aug. 18, 1960, Ser. No. 50,434
2 Claims. (Cl. 137—210)

The present invention consists of apparatus for eliminating undesired air from the water of heating and cooling systems of the type including a plurality of heat transfer units located at a plurality of levels (such as different floors in a multi-storey building) and including temperature altering means, such as a boiler and/or a cooling unit or refrigerator, for either heating a quantity of water-circulating through the heat transfer units and interconnecting duct means or for cooling same. In other words, the apparatus of the present invention may be used in association with a plurality of radiant convectors or heaters adapted to radiate heat into a plurality of rooms of a building at a plurality of levels when water heated by the central boiler of the overall system is circulated therethrough, and adapted to effectively absorb heat from the plurality of rooms when water cooled by a central refrigeration or cooler unit is circulated therethrough.

In prior art systems of the type referred to above, which are frequently employed in large buildings, one of the major problems is the fact that air entrapped in the circulating water may rise to one of the upper heat transfer units and act as an effective block for the circulating water which is intended to pass therethrough, thus effectively rendering that particular heat transfer unit inoperable and possibly rendering other heat transfer units in series therewith also inoperable. In the past about the only way to correct this situation was to remove the trapped air from the blocked heat transfer unit, which was a time-consuming and frequently-required maintenance operation in such systems.

In such prior art systems, expansion tank and air chamber means are customarily employed to minimize undesirable maximum pressure variations occurring as a result of the heat cycle extremes occurring in response to the boiler fire going on and off, as controlled by a thermostat which is intended to maintain the temperature of the heated water within a predetermined minimum-to-maximum temperature range. In multi-storey systems of this type, it will readily be understood that the use of an expansion tank and entrapped air will minimize pressure rise occurring when the water is heated by the boiler to its maximum, and will correspondingly minimize the pressure drop when the water drops to its lowest allowed temperature when the boiler fire is off.

If such prior art expansion tanks and air chambers were not used, the pressure rise would be excessive and might endanger the entire system by causing a leak at the weakest point therein. Indeed, the boiler and/or the system is normally provided with a relief valve in order to prevent excessive pressure in the system in addition to being provided with a circulating pump and a minimum pressure-determining regulator associated with an incoming water make-up line from a water supply main which is adapted to supply any deficiency of water in the system and to maintain it at a pressure above a predetermined minimum value. This water make-up is necessitated by reason of losses from the system such as through the relief valve, and the like.

While the above-mentioned prior art expansion tank and air chamber acts to minimize undesirable and excessive pressure variations within the complete system as a result of temperature cycling, it has the undesirable effect of causing entrapped air effectively mixed with and absorbed by the water in the system of the expansion tank to be carried to one or more of the heat transfer units quite often, thus frequently resulting in the hereinbefore-mentioned entrapped air blockage of a heat transfer unit. This makes necessary frequent servicing of such a system by the removal of such entrapped air from various of the heat transfer units. This problem is aggravated by reason of the fact that alternate pressure cycles within the system occurring in response to temperature cycles caused by the boiler fire going on and off, cause the air-water mixture to cycle into and out of the expansion tank in a manner which greatly increases the entrapment of air in the circulating water going to the heat transfer units. Furthermore, this is additionally aggravated by the fact that such prior art expansion tanks usually have a very large air-water interface which is normally relatively cool because of being never completely circulated through the expansion tank and which, therefore, increases the solubility of the air into the water, thus causing a very great degree of entrapment of air in the circulating water and increasing the likelihood of the hereinbefore-mentioned air blockage of various of the heat transfer units.

It is an object of the present invention to provide apparatus for eliminating undesired air from the water of heating and cooling systems of the type referred to above, including a water-passing but air-trapping and/or separating means of novel construction adapted to pass heated or cold water within the system and also supplementary make-up water therethrough in one direction only (positively preventing return flow in the undesirable manner of prior art expansion tanks and air chambers) and in the process of passing such water therethrough effectively separating and trapping any air which may be contained in the water, whereby the water emitted therefrom and returning to the circulating system will be virtually stripped of undesirable air. This virtually entirely prevents the entrapped air blockage of heat transfer units of the undesirable prior art type mentioned above.

It is a further object of the present invention to provide novel apparatus of the character set forth above, wherein the water-passing but air-separating and trapping means comprises a hollow casing having a vertical length substantially greater than its horizontal dimensions and including a lower water chamber portion adapted to receive and contain inflowing water and including thereabove an upper air chamber portion adapted to receive air bubbles separated from the inflowing water, with said air and water being adapted to contact each other at an interface region of very small area with respect to the total volume of water and/or air adapted to be contained within the casing, whereby to minimize the percentagewise absorption of air from the air chamber portion into the water in the water chamber portion therebelow, with respect to the total volume of water and/or air in the casing and/or in the entire system. Furthermore, it should be noted that the substantially greater vertical length to horizontal dimensions of the casing of the present invention causes the relatively small area air-water interface to include the surface of the very hottest water within the casing, whereby to minimize the solubility of air in the water even further than that produced by the above-mentioned minimization of the area of said air-water interface with respect to the total volume of air and/or water in the casing and/or the entire system.

Further objects are implicit in the detailed description which follows hereinafter and will be apparent to persons skilled in the art after a careful study therof.

For the purpose of clarifying the nature of the present invention, one exemplary embodiment is illustrated in the hereinbelow-described figures of the accompanying two sheets of drawings and is described in detail hereinafter.

FIG. 1 is a fragmentary diagrammatic, schematic view of one illustrative embodiment of the present invention used in association with a heating and cooling system of the type including a plurality of heat transfer units located on a plurality of floors of a building and connected to duct means, which are controllably connected to either a heating boiler for use during cold weather or to a refrigerating cooler for use during hot weather. This view shows the water passing but air trapping and separating unit of the present invention so connected with respect to the heating and cooling system as to effectively continuously pass circulating water therethrough and also make up water, as required, therethrough while effectively removing and trapping air therein so that the emitted water is effectively stripped of undesirable entrained or entrapped air.

FIG. 4 is a cross-sectional view taken in the direction of arrows 4—4 of FIG. 5.

FIG. 5 is a vertical sectional view taken centrally vertically through the entire device in the direction of the arrows 5—5 of FIG. 2. This view shows the inlet check valve means in open position and the outlet check valve means in closed position.

FIG. 6 is a view similar to FIG. 5, but shows the inlet check valve means in closed position and the outlet check valve means in open position. In this connection, it should be clearly understood that normally they are alternately open or closed as a result of the pressure cycle within the system occurring in response to the temperature cycle within the system produced by the boiler fire going on or off or, when the boiler is cut out of the system and the cooler or refrigerator system is employed, in response to the temperature cycle produced thereby as the refrigerator unit goes on or off.

Figure 1:
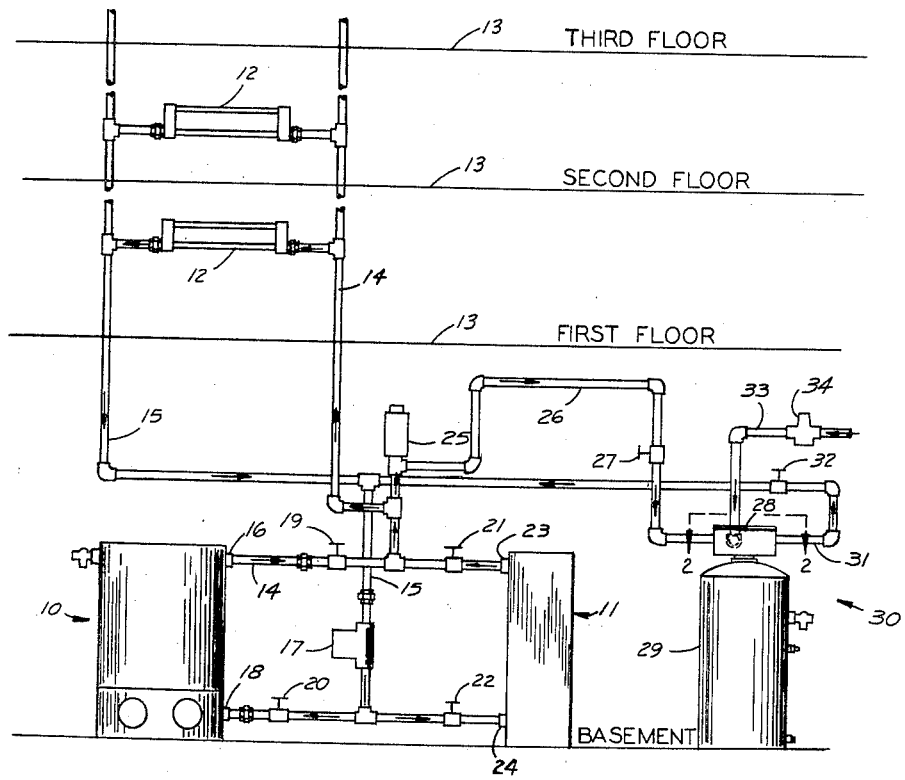
Figures 2, 3:
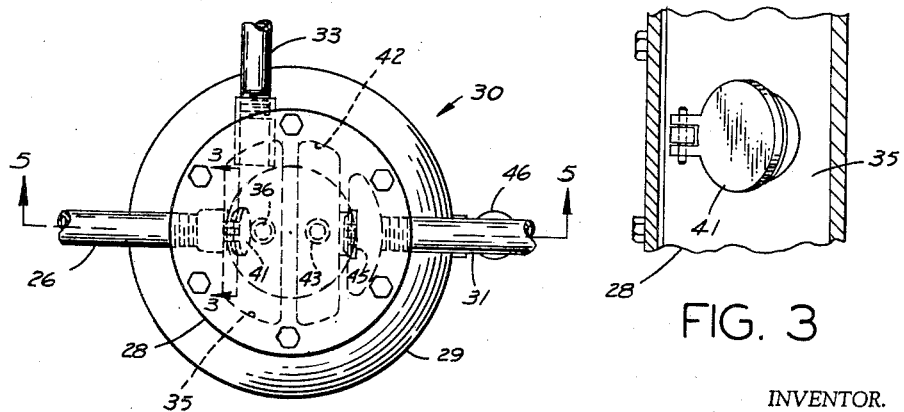
FIG. 2 is an enlarged view taken in the direction of the arrows 2—2 of FIG. 1 showing the water-passing, air-stripping apparatus of the present invention and fragments of the interconnecting duct means.
FIG. 3 is an enlarged fragmentary sectional view taken in the direction of the arrows 3—3 of FIG. 2 and shows the inlet check valve means connecting the circulating water inlet conduit means to an inlet intermediate chamber at the top of the water-passing, air-stripping apparatus of the present invention.

Referring to the figures for exemplary purposes, FIG. 1 shows, in fragmentary form, a typical heating and cooling system including a boiler 10, a cooling unit 11, a plurality of heat transfer units 12 located on different floors 13 of a building (shown fragmentarily and diagrammatically in terms of the first three floors thereof only), interconnecting duct means including an outgoing or supply duct 14 and an incoming or return duct 15, with each of the heat transfer units 12 connected in parallel therebetween, although in certain instances more than one heat transfer unit on a given floor may be connected in series. The outgoing or supply duct 14 is connected with respect to an outflow fitting 16 of the boiler 10, while the return duct 15 is connected with respect to a water circulating pump 17 and an inflow fitting 18 carried by the boiler 10, thus providing a continuous circulation of water through the boiler 10, where it is heated by conventional heating means (not shown) and after heating is fed through the outflow or supply duct 14, through the plurality of heat transfer units or radiators 12, through the return duct 15 and circulating pump 17 back to the boiler 10 for reheating and continuous recirculation.

The heating and cooling system shown in FIG. 1 also includes the hereinbefore-mentioned cooling or chilling unit 11, which may comprise a refrigerator, a heat transfer device carrying a coolant circulating therethrough in cooling relationship with respect to the water in the cooling system, or any other type of cooling unit. It should be noted that when the system is to act as a heating system, the valves 19 and 20 are open and the valves 21 and 22 are closed, thus causing the system water recirculated by the pump 17 to pass through the boiler 10 and through the supply duct 14, the heat transfer units 12, and the return duct 15. However, when the system is to act as a cooling system, the valves 19 and 20 are closed and the valves 21 and 22 are opened, thus effectively connecting the outflow fitting 23 of the cooling unit 11 with respect to the outflow or supply duct 14 and also connecting the inflow or return fitting 24 with respect to the return duct 15, whereby the circulating pump 17 will circulate the system water through the cooling unit 11 out the fitting 23, through the valve 21, through the supply duct 14, through the plurality of heat transfer units 12 (which now act as heat absorption cooling units), through the return duct 15, through the circulating pump 17, and through the return or inlet fitting 24 back into the cooling unit 11. In other words, when the valves 21 and 22 are closed and the valves 19 and 20 are open, the system acts as a heating system. However, when the valves 19 and 20 are closed, and the valves 21 and 22 are open, the system acts as a cooling system. This is so because the boiler 10 and the cooling unit 11 are connected in parallel between the circulating pump 17 (connected to the return duct 15) and the supply duct 14, with each pair of valve means 19—20 and 21—22 being alternately openable and closable for connecting either the boiler 10 or the cooler unit 11 into the system.

The boiler 10 is normally of the type adapted to be thermostatically controlled—that is, to have a thermostat controlling the burners of the boiler whereby to maintain water heated by the boiler within a predetermined minimum-to-maximum temperature range. This is also true with respect to the cooling unit 11, although the thermostatic control is normally such as to maintain the cooled water within a predetermined maximum-to-minimum temperature range. These features are not shown in detail since such are well-known in the art and comprise no part of the real invention.

Also connected to the supply duct 14 is an air chamber 25 and a duct 26 passing through a valve means 27 and into an upper member 28 carried by a hollow cylindrical casing 29; the upper member 28 and the hollow cylindrical casing 29 together effectively comprising the water-passing but air-separating and trapping means of the present invention, which is indicated generally at 30.

It should be noted that the conduit 26, where it passes into the upper member 28, effectively comprises an inlet conduit means to the water-passing air-trapping and separating means 30 comprising the present invention while a conduit means 31, also connected to the upper member 28, effectively comprises an outlet conduit means from the water-passing and air-separating and trapping means 30 of the present invention; the outlet conduit means 31 passing through a control valve 32 and then connecting to the return duct 15.

It should also be noted that a make-up supply of water to compensate for any deficiencies of water in the complete system, is adapted to be supplied from a source of water under pressure (not shown) through a make-up water inlet conduit 33 and a regulator valve 34 adapted to maintain a minimum water pressure within the heating and cooling system; the end of the make-up water inlet conduit 33 being connected to the upper member 28 carried by the casing 29 and comprising the water-passing and air-separating and trapping means 30 of the present invention.

It will be noted that the arrangement is such that circulating system water communicating with the air chamber 25 enters the water-passing and air-separating and trapping means 30 of the present invention whereby to effectively strip the air from the water passed therethrough, and that make-up water entering the system through the make-up water inlet conduit 33 also passes through the device 30 of the present invention, which effectively strips it of entrapped and entrained air. This stripping of entrapped or entrained air from water passing through the device 30 of the present invention virtually completely prevents the possibility of entrapped or entrained air becoming lodged in the heat transfer units 12 and blocking same in the undesirable prior art manner mentioned hereinbefore.

The upper member 28 of the device 30 of the present invention comprises means defining an inlet intermediate chamber 35 positioned between the inlet conduit means 26 and an injection tube means 36 which extends downwardly from the intermediate inlet chamber 35 into the upper part of a water chamber portion 29W within the hollow casing 29, which also has an upper air chamber portion 29A positioned above the water chamber portion 29W. The water chamber portion 29W is adapted to carry therein a quantity of water 37, while the air chamber portion 29A is adapted to carry therein a quantity of air 38, with the air 38 and the water 37 being adapted to contact each other at a circular interface region 39 of relatively small area with respect to the total volume of water 37 and the total volume of air 38 contained within the casing 29 and also with respect to the total volume of air and water within the complete system. This minimizes the percentagewise absorption of the air 38 in the air chamber portion 29A into the water 37 in the water chamber portion 29W. Said absorption of air is further minimized by reason of the great length-to-diameter ratio of the casing 29, which causes the water at the air-water interface 39 to be the very hottest water within the casing 29. This is true because air has a lesser solubility in hot water than in cold water.

It should be noted that the lower end of the injection tube means 36 is provided with an egress opening, as indicated at 40, which allows an inflowing mixture of water 37 and air to be admitted below the surface of the water 37 but relatively near thereto so that the hot water and entrained or entrapped air will rise to the interface 39, at which level the hot water will remain while the air bubbles will continue to rise into the air chamber portion 29A and become part of the entrapped air 38 carried therein. It should be noted that the intermediate inlet chamber 35 carries an inlet check valve means 41 therein which opens only when a positive pressure differential exists thereacross from the inlet conduit means 26 to the intermediate chamber 35 and the injection tube means 36; said inlet check valve means 41 being closable in response to negative differential pressure thereacross in the opposite direction. The open condition of said inlet check valve means 41 is shown in FIG. 5, while the closed condition thereof is shown in FIG. 6.

The upper member 28 also comprises means defining an outlet intermediate chamber 42 positioned between the outlet conduit means 31 and a pure water ejection tube means 43 which extends downwardly from the outlet chamber 42 into the lower part of the water chamber portion 29W of the casing 29, where it is provided with an ingress opening 44 for the reception thereinto of the pure air-stripped water contained in the bottom of the casing 29. The outlet chamber 42 also carries an outlet check valve means 45 positioned between the pure water ejection tube means 43 and the outlet conduit means 31 in a manner openable in response to a positive pressure differential thereacross from the ejection tube means 43 to the outlet conduit means 31 and closable in response to negative differential pressure thereacross. The closed condition of the outlet check valve means 45 is shown in FIG. 5 while the open condition thereof is shown in FIG. 6.

It should be noted that the make-up water inlet conduit 33 connects to the intermediate inlet chamber 35 and, therefore, also passes through the injection tube means 36, the interior of the casing 29, the pure water ejection tube means 43, the outlet check valve means 45 and the outlet conduit means 31. In other words, both circulating water in the inlet conduit means 26 and make-up water in the conduit means 33 are passed through the apparatus 30 of the present invention in the form of pure water effectively stripped of entrapped or entrained air, thus accomplishing the purposes of the present invention.

A controllably openable and closable air cock is indicated at 46, while an air inlet check valve is indicated at 47 and a drain plug is indicated at 48. These may be used to control the air and water level within the casing 29 and, therefore, the positioning of the air water interface 39 to an optimum level. The drain plug 48 may be used for draining water out of the system, for reducing the quantity thereof, or for repair, maintenance, or cleaning purposes.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Apparatus for eliminating undesired air from the water of heating and/or cooling systems, comprising: water-passing, air-trapping means comprising a hollow casing having a vertical length substantially greater than its horizontal width, including a lower water chamber portion adapted to receive and contain water of an inflowing water-and-air mixture, and including thereabove an upper air chamber portion adapted to receive air bubbles separated from the water of the inflowing water-and-air mixture, with the separated air and water being adapted to contact each other at an interface region of small area with respect to the total volume of water adapted to be contained in the water chamber portion thereof whereby to minimize the percentage-wise absorption of air from the air chamber portion into the water in the water chamber portion therebelow; inlet conduit means provided with a water-and-air-mixture injection tube means connected therefrom downwardly into the upper part of said water chamber portion and provided, between said inlet conduit means and said water-and-air-mixture injection tube means, with inlet check valve means openable in response to positive pressure differential thereacross from said inlet conduit means to said injection means and closable in response to negative differential pressure thereacross; and outlet conduit means provided with pure separated-water ejection tube means connected therefrom downwardly into the lower part of said water chamber portion and provided, between said outlet conduit means and said ejection tube means, with outlet check valve means openable in response to positive pressure differential thereacross from said ejection tube means to said outlet conduit means and closable in response to negative differential pressure thereacross, said hollow casing being provided at its upper end with means defining an inlet intermediate chamber positioned between said inlet conduit means and said injection tube means and of substantially larger effective interior cross-sectional area than said inlet conduit means and said injection tube means whereby to comprise an enlarged-volume region in the flowpath between said inlet conduit means and said injection tube means and carrying said inlet check valve means therein, said means at the upper end of said hollow casing also defining an outlet intermediate chamber positioned between said ejection tube means and said outlet conduit means and of substantially larger effective interior cross-sectional area than said ejection tube means and said outlet conduit means whereby to comprise an enlarged-volume region in the flowpath between said ejection tube means and said outlet conduit means and carrying said outlet check valve means therein, said inlet and outlet enlarged intermediate chambers being provided with closure means isolating same completely from the lower interior portion of said hollow casing except for said injection tube means and ejection tube means passing therethrough and further being provided with separating wall means transversely positioned between and isolating said enlarged inlet and outlet intermediate chambers from each other, said inlet check valve means comprising a freely pivotally mounted swinging gate member positioned entirely within said enlarged inlet intermediate chamber and valve seat means communicating with the smaller size inlet conduit means and positioned on the inflow side of said gate member and physically outwardly thereof with respect to said enlarged inlet intermediate chamber for sealing engagement when said gate member freely pivotally moves outwardly toward said valve seat means into a position depending below its free pivotal mounting and for pivotal opening movement when said gate member freely pivotally moves inwardly away from said valve seat means as a result of inwardly directed differential pressure acting thereacross, said movement of said gate member occurring entirely within said enlarged inlet intermediate chamber, said outlet check valve means comprising a freely pivotally mounted swinging gate member positioned entirely within said enlarged outlet intermediate chamber and valve seat means communicating with the smaller size outlet conduit means and positioned on the inflow side of said gate member and physically inwardly thereof with respect to said smaller size outlet conduit means for sealing engagement when said gate member arcuately freely pivotally moves inwardly toward said valve seat means into a position depending below its free pivotal mounting and for pivotal opening movement when said gate member freely pivotally moves outwardly away from said valve seat means as a result of outwardly directed differential pressure acting thereacross, said movement of said gate member occurring entirely within said enlarged outlet intermediate chamber, said enlarged inlet intermediate chamber being provided with make-up water inlet conduit means connected directly thereto for supplying auxiliary pressurized make-up water thereinto for injection into said lower water chamber portion through said injection tube means whereby to maintain the quantity of air-stripped water circulating through a heat exchange system having said water-passing, air-trapping means in circuit therewith at a substantially constant volume.

2. Apparatus of the character defined in claim 1, wherein the side wall of said hollow casing is provided with inlet check valve means for controllably admitting pressurized air thereinto, controllably openable and closable spigot means for altering the water level within the casing, and controllably openable and closable drain means adjacent the bottom thereof for emptying said casing for cleaning purposes.

References Cited in the file of this patent

UNITED STATES PATENTS

| | | |
|---|---|---|
| 523,872 | Stahl | July 31, 1894 |
| 1,459,775 | Larner | June 26, 1923 |
| 2,482,198 | Melichar | Sept. 20, 1949 |
| 2,782,016 | Iannelli | Feb. 19, 1957 |
| 2,896,862 | Bede | July 28, 1959 |
| 2,909,187 | Gillooly | Oct. 20, 1959 |